O. G. Brady,

Skate Attachment.

No. 2,819. Reissued Dec. 24, 1867.

Witnesses:

Inventor:

Oliver G. Brady

AM. PHOTO-LITHO. CO. N.Y. (OSBORNE'S PROCESS.)

United States Patent Office.

PHINEAS SMITH, OF NEW YORK, N. Y., ASSIGNEE OF OLIVER G. BRADY.

*Letters Patent No.* 36,503, *dated September* 23, 1862; *reissue No.* 2,819, *dated December* 24, 1867.

IMPROVEMENT IN SKATES.

The Schedule referred to in these Letters Patent and making part of the same.

TO ALL WHOM IT MAY CONCERN:

Be it known that OLIVER G. BRADY, of the city and county of New York, in the State of New York, did invent certain new and useful Improvements in Means for Attaching Skates to Boots, for which improvements Letters Patent of the United States were issued to said BRADY on the twenty-third day of September, 1862, and numbered 36,503; that said Letters Patent, by a deed of assignment, duly executed and recorded, were conveyed to me, PHINEAS SMITH, of the city of New York aforesaid; and that having been advised by counsel learned in the law that said Letters Patent are inoperative and invalid, by reason of a defective specification, I have applied to the Commissioner of Patents to issue to me, for said invention, new Letters Patent, under an amended specification; and I do hereby declare that the following is a full and exact description thereof, reference being had to the accompanying drawings, making a part of this specification, in which—

Similar letters of reference indicate corresponding parts in the several figures.

To enable others skilled in the art to make and use my invention, I will proceed to describe its construction and operation.

Figure 1:
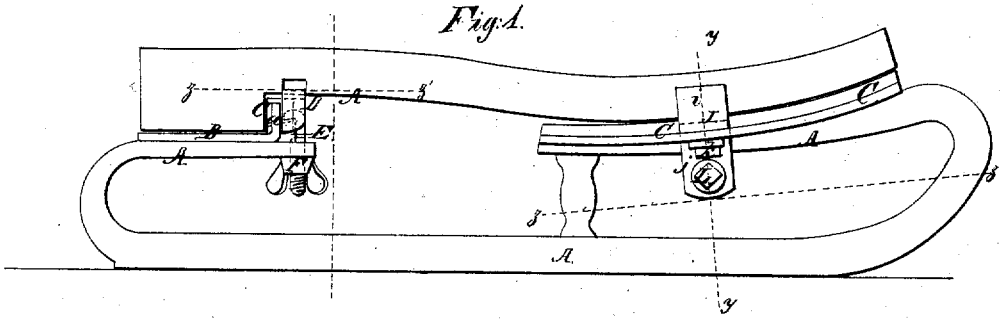
Figure 1 is a side elevation of a skate-iron furnished with my improved fastenings.
Figure 3:
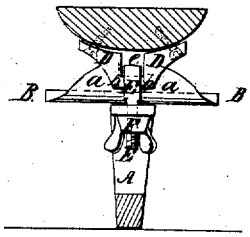
Figure 3 is a transverse section through fig. 1, in the vertical plane indicated by the red line *y y* thereon.
Figure 4:
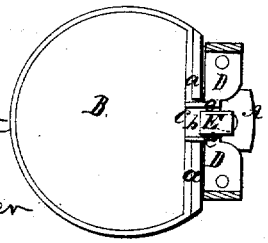
Figure 4 is a top view of the heel part of the skate shown in fig. 1.

A represents the skate-iron, which is bent in the shape represented in fig. 1 of the drawings, the ends thereof being turned up and curved over, so as to form respectively the heel and toe-supports. B represents the heel-stand, which is of a sufficient size to give a firm bearing for the heel of the boot, and C represents the sole-stand, which may be covered with leather or other suitable yielding substance. These two plates, B and C, are riveted securely to the upper portions of the skate-iron A, and they form the supports for the boot when the skate is secured to it. The front edge, *b*, of the heel-plate B, is turned up, as shown in figs. 1, 3, and 4 of the drawings, and a slot, *z'*, is formed in this turned-up portion, for receiving a tenon-projection, *d*, which is on a shank-plate, D, when the skate is secured to the boot, and preventing the boot, at the heel, from having any lateral play on the heel-plate B. E represents a hooked portion, which is of suitable length, having a male-screw thread cut on its lower end. This screw portion E is passed down through a hole, which is made vertically through the end of the iron, A, in front of the heel-plate B, as shown in figs. 1 and 3 of the drawings, and on the lower end of this hooked screw E is a thumb-nut, F. D represents the shank-piece, which is suitably secured to the shank of the boot, directly in front of the heel of the boot, as shown in fig 1 of the drawings, wherein the red lines represent the sole of a boot to which the skate is fastened. This shank-portion D has an eye, —, in it, for receiving the hook E, as shown in figs. 1, 3, and 4, and has also a tenon, *d*, projecting from its back surface, which tenon lies up against the inside surface of the heel of the boot, leaving a space on each side of the tenon *d*, sufficient to receive the turned-up edge *b* of the heel-plate B. Then when the heel of the boot is put upon the plate B, and the tenon *d* passed into the slot *z'*, in the edge *b*, the hook on portion E is passed into the eye —, in the shank-portion D, and by means of the nut F, the hooked portion E can be set up light, and the skate secured rigidly to the heel of the boot. The objection to skates hitherto used, having fastenings which secure them to the sole and heel of the boot, is, that in the ordinary movements and exertions of skating, the heels of the boots are frequently strained and twisted off. But it will be seen, from the above description of my improved heel-fastening, that the skate is not secured to the heel of the boot, but to the shank of the boot, in advance of the heel, and so near to the heel that the shank will not be strained or injured in the least. The plate D, which is secured to the shank, is not subject to any wear in using the boots for ordinary purposes, and this is another advantage attained over other skate-fastenings which have plates secured to the surface of the heel, and which are soon worn out, rendering the fastening useless.

Figure 2:
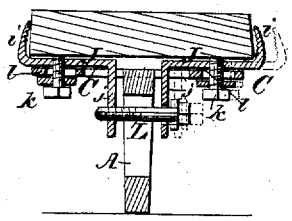
Figure 2 is a transverse section through fig. 1, in the vertical plane indicated by the red line *x x* thereon.
Figure 5:
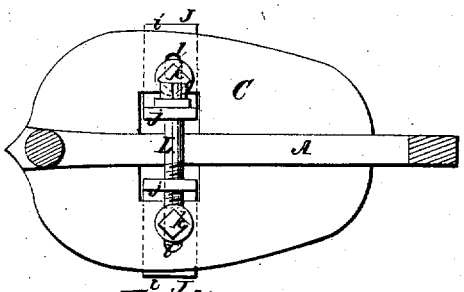
Figure 5 is a bottom view of the front attachment.

The fastening for attaching the skate to the sole of the boot, under the ball of the foot, consists of two slotted clamping-jaws, J J, shown in figs. 1, 2, and 5, of the drawings. Each has a serrated griping-portion, *j*, and an ear-portion, *j'*, and is formed by turning up one end of a straight piece of metal, and turning down the opposite end, as shown in fig. 2. These clamping-jaws J J are attached to the plate C by means of set-screws, *k k*, which pass through transverse slots, *e e*, in plate C, and are tapped into the clamping-jaws J J. The ears *j j* pass down through a large hole, which is made through plate C, and the griping-portions *j j* project up each side of this plate C. Slots *e e* in the plate C, allow the jaws J J to be adjusted laterally when the set-screws *k k* are loosened. L is an adjusting-screw, which passes loosely through one of the ears *j*, and is tapped into the opposite ear. This screw L is used to adjust the plates J J, and a square head is formed on it, for receiving a key for turning the screw. Now, it will be seen that by loosening one or both of the set-screws *k k*, one or both of the clamping-jaws or plates J J may be adjusted to any desired point, and then secured rigidly to the plate C, by tightening the set-screw or screws *k*. When only one of the clamping-jaws J J is thus liberated, and the screw L is turned, the loose jaw only will be moved. By this arrangement the boot may be set exactly in the centre of the skate, and whether the sole of the boot be very much twisted or straight, the plates or jaws J J can be adjusted so as to bring the foot exactly in the centre of the skate.

The operation of securing the skate herein described to the boot is as follows: The plates B C are brought up against the sole of the boot, and the portion E is hooked into the eye in the shank-piece D. Then the nut F is screwed up tightly, so as to draw the heel of the boot solidly against the plate B. The lip or turned-up portion, *b*, of the heel-plate, will now prevent any longitudinal or lateral play of the skate at the heel, and the hooked portion E will keep the parts fixedly in place. The set-screws *k k* being previously slackened, the screw L is now tightened, and then the set-screws *k k* are again tightened, so that the jaws *j j* are made to clamp the boot by the edges of the sole, and hold the sole of the boot down securely to the plate C. Should it be found, when the skate is secured to the boot, that the skate-iron is not in the centre of the boot, the set-screws *k k* are loosened, and the skate-iron may be moved to the right or to the left, until it is in the centre of the boot, when one of the screws *k* is tightened again, thus establishing the skate-iron in the desired position. The plate C is covered on its top surface with a piece of leather or other suitable material, which is cut out so as to fit over the transverse portions of the clamping-jaws or plates J J, which are on the top of the plate C, thus leaving a smooth surface for the front part of the boot to rest upon.

I do not wish to confine myself to the particular form of the skate-iron, as the fastenings can be readily applied to different-shaped irons.

Having thus described the invention, what I claim as new, and desire to secure by Letters Patent, is as follows:

1. I claim, in skates, the side clamps J J, arranged near the toe of the skate, and the tightening-means L, adapted to draw the same forcibly together, all combined and arranged as and for the purposes herein set forth.

2. I claim, in skates, the set-screws *k k*, arranged as specified, in combination with the tightening-means L, and side clamps J J, so as not only to allow the side clamps to be drawn forcibly together, to seize the boot, but also to allow the foot to be adjusted, either centrally upon the skate, or to any extent one side or the other, to suit the wearer, and be held firmly against shaking in any position, all as and for the purposes herein set forth.

3. I claim the arrangement of the shank-piece D and heel-plate B with the shank of the boot, runner A, and adjustable tightening-hook, E, as herein shown and described.

PHINEAS SMITH.

Witnesses:

WM. C. DEY,

C. C. LIVINGS.